(12) United States Patent
Jose et al.

(10) Patent No.: US 11,487,851 B2
(45) Date of Patent: Nov. 1, 2022

(54) USING BLOCKCHAIN FOR FLEXIBLE APPLICATION LICENSING

(71) Applicant: INTERNATIONAL BUSINESS MACHINES CORPORATION, Armonk, NY (US)

(72) Inventors: Rojan Jose, Apex, NC (US); Brian M. Arthur, Salt Lake City, UT (US); Akash U. Dhoot, Pune (IN); Shailendra Moyal, Pune (IN); Joseph Korting, Reading (GB); Karan K. Navani, London (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 787 days.

(21) Appl. No.: 15/924,469

(22) Filed: Mar. 19, 2018

(65) Prior Publication Data
US 2019/0286794 A1     Sep. 19, 2019

(51) Int. Cl.
*G06F 21/10* (2013.01)
*G06F 21/31* (2013.01)
*G06F 21/64* (2013.01)

(52) U.S. Cl.
CPC ............ *G06F 21/105* (2013.01); *G06F 21/31* (2013.01); *G06F 21/64* (2013.01); *G06Q 2220/18* (2013.01)

(58) Field of Classification Search
CPC ........ G06F 21/105; G06F 21/31; G06F 21/44; G06Q 2220/18
See application file for complete search history.

(56) References Cited

U.S. PATENT DOCUMENTS

| 9,003,541 | B1* | 4/2015 | Patidar | G06F 21/50 726/26 |
| 10,755,226 | B1* | 8/2020 | Robyak | G06K 7/10366 |
| 2013/0041852 | A1* | 2/2013 | Ellis | H02J 3/14 705/412 |
| 2016/0070891 | A1* | 3/2016 | Angelov | G06F 21/10 726/26 |
| 2017/0083697 | A1* | 3/2017 | Hayashi | G06F 21/608 |

(Continued)

FOREIGN PATENT DOCUMENTS

| CN | 106296359 A | 4/2017 |
| CN | 107257340 A | 10/2017 |

(Continued)

OTHER PUBLICATIONS

"Design_of_Network_Medias_Digital_Rights_Management_Scheme_Based_on_Blockchain_Technology"; Ruzhi Xu, Lu Zhang, Huawei Zhao, Yun Peng; 2017 IEEE 13th International Symposium on Autonomous Decentralized Systems (Year: 2017).*

(Continued)

*Primary Examiner* — John W Hayes
*Assistant Examiner* — Edgar R. Martinez-Hernandez
(74) *Attorney, Agent, or Firm* — Griffiths & Seaton PLLC (57) ABSTRACT

A system and method for using blockchain for flexible application licensing are presented. A licensing token, from a pool of licensing tokens, is provided using a transactional database based on blockchain protocols for using an application. Usage of each application may be validated according to the one or more licensing tokens using the transactional database.

15 Claims, 6 Drawing Sheets

(56) References Cited

U.S. PATENT DOCUMENTS

| | | | |
|---|---|---|---|
| 2017/0116693 A1 | 4/2017 | Rae et al. | |
| 2017/0118294 A1* | 4/2017 | Verma | H04L 69/329 |
| 2018/0183687 A1* | 6/2018 | Dementev | H04L 41/50 |
| 2018/0314809 A1* | 11/2018 | Mintz | H04L 9/3297 |
| 2019/0004789 A1* | 1/2019 | Mills | G06F 8/36 |

FOREIGN PATENT DOCUMENTS

| | | | | |
|---|---|---|---|---|
| CN | 107733675 A | * | 2/2018 | H04L 41/04 |
| CN | 107770115 A | | 6/2018 | |
| WO | 2016179334 A1 | | 11/2016 | |
| WO | 2017027484 A1 | | 2/2017 | |
| WO | 2017173399 A1 | | 10/2017 | |
| WO | 2018006072 A1 | | 1/2018 | |

OTHER PUBLICATIONS

"DRM_Framework_Towards_Preventing_Digital_Piracy"; Ravi Sankar Veerubhotla and Ashutosh Saxena; 2011 7th International Conference on Information Assurance and Security (IAS) (Year: 2011).*

"Digital Rights Management: Model, Technology and Application"; Zhaofeng Ma; China Communications (vol. 14, Issue: 6, pp. 156-167); (Year: 2017).*

"Interactive Proof-of-stake"; Alexander Chepurnoy; (Year: 2016).*

"System and method for providing a tamper-proof and trustless mechanism to validate the usage of IT assets"; Disclosed Anonymously; from the IP.com Prior Art Database; (Year: 2018).*

"Integrating Blockchain for Data Sharing and Collaboration in Mobile Healthcare Applications"; Xueping Liang • Juan Zhao • Sachin Shetty • Jihong Liu • Danyi Li; 2017 IEEE 28th Annual International Symposium on Personal, Indoor, and Mobile Radio Communications (PIMRC) (pp. 1-5); (Year: 2017).*

Herbert et al., "A Novel Method for Decentralized Peer-to-Peer Software License Validation Using Cryptocurrency Blockchain Technology," Proceedings of the 38th Australasian Computer Science Conference (ACSC 2015), Jan. 27-30, 2015 (9 pages).

Park et al., "Blockchain Security in Cloud Computing: Use Cases, Challenges, and Solutions," Symmetry, 2017 (13 pages).

Yang et al., "Mechanisms for Validating Authorization/Delegation Hierarchy Using Blockchain Technology," An IP.com Prior Art Database Technical Disclosure, IP.com No. IPCOM000248695D, Dec. 27, 2016 (13 pages).

Anonymous, "System and Method for Software Asset Management Powered by Blockchain and Smart Contacts," An IP.com Prior Art Database Technical Disclosure, IP.com No. IPCOM000248083D, Oct. 24, 2016 (6 pages).

Anonymous, "Dynamic Software License Morphing," An IP.com Prior Art Database Technical Disclosure, IP.com No. IPCOM000240234D, Jan. 14, 2015 (4 pages).

* cited by examiner

TABLE 1: SKU TO BLUEKEYS MAPPING

| ORGANIZATION | PRODUCT SUITE | SKU | BLUEKEYS |
|---|---|---|---|
| ORGANIZATION 1 | SUITE 1 | SKU-1 | 10 |
| | | SKU-2 | 20 |
| | | SKU-3 | 25 |
| | SUITE 2 | SKU-4 | 10 |
| | | SKU-5 | 15 |
| TOTAL BLUEKEYS | | | 80 |
| | | | |
| ORGANIZATION 2 | SUITE 1 | SKU-1 | 5 |
| | | SKU-2 | 10 |
| | | SKU-3 | 15 |
| TOTAL BLUEKEYS | | | 30 |

USING BLOCKCHAIN FOR FLEXIBLE APPLICATION LICENSING

BACKGROUND OF THE INVENTION

Field of the Invention

The present invention relates in general to computing systems, and more particularly to, various embodiments for building a trusted and flexible application licensing model using blockchain by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these computing systems.

SUMMARY OF THE INVENTION

Various embodiments for using blockchain for flexible application licensing using one or more processors are provided. In one embodiment, by way of example only, a method for using blockchain for flexible application licensing, again by a processor, is provided. A licensing token, from a pool of licensing tokens, is provided using a transactional database based on blockchain protocols for using an application. Usage of each application may be validated according to the one or more licensing tokens using the transactional database.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Many computing applications require use of an application license (e.g., "software license"), which can limit the capability of a user or organization using the application. Also, an application license may create challenges for effectively managing a fluid workforce. For example, some application licensing requires an entity (e.g., business, organization, etc.) to either buy a license per user or have a limit of how many users log on concurrently to the application. Application consumption and usage data is primarily owned by the entity using the purchased application. Moreover, usage data is not readily available to a vendor and may only be shared, for example, during an audit. The inability to access usage data makes the process of investigating over usage of the application and the ability to cross-sell and upsell product offerings expensive and difficult for the vendors.

Thus, a need exists need for providing a solution to optimize license usage, track the usage by "concerned parties" in a trusted manner and even facilitate new economic opportunities for the application vendors, where "concerned parties" may include application vendors, customers/users, business partners, and auditors.

In one aspect, the present invention provides for using blockchain for flexible application licensing. A blockchain is a distributed database that may be used to maintain a transaction ledger. A transaction ledger may denote an ordered set of transactions that have been validated or confirmed within a system up to a certain point in time. A transaction ledger may include a continuously-growing list of data records, where each data record may include data relating to one transaction. Further, encryption and other security measures may be used to secure the transaction ledger from tampering and revision. A blockchain may include a number of blocks, each block holding one or more individual transactions or data records. Further, each block may contain a timestamp and a link to a previous block. A blockchain network may be used and enabled users may be allowed to connect to the network, send new transactions to the blockchain, verify transactions, and create new blocks.

The mechanisms of the illustrated embodiments provide a blockchain for flexible application licensing. A licensing token, from a pool of licensing tokens, may be provided using a transactional database based on blockchain protocols for using an application. Usage of each application may be validated according to the one or more licensing tokens using the transactional database.

The licensing token (e.g., abstract tokens) may be referred to herein as "BlueKeys." The licensing token (e.g., the BlueKeys) allows for "floating" of licenses (e.g., transferable) across users and time. The BlueKeys enable a user to use a selected application at a selected time without having to cater to individual application consumption (e.g., using only one license per user per application). In one aspect, the license usage is broken down at a granular level via the licensing token termed as BlueKeys. BlueKeys may be a count set against every licensed application and/or stock keeping unit (SKU) identification code for an application sold to a customer.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
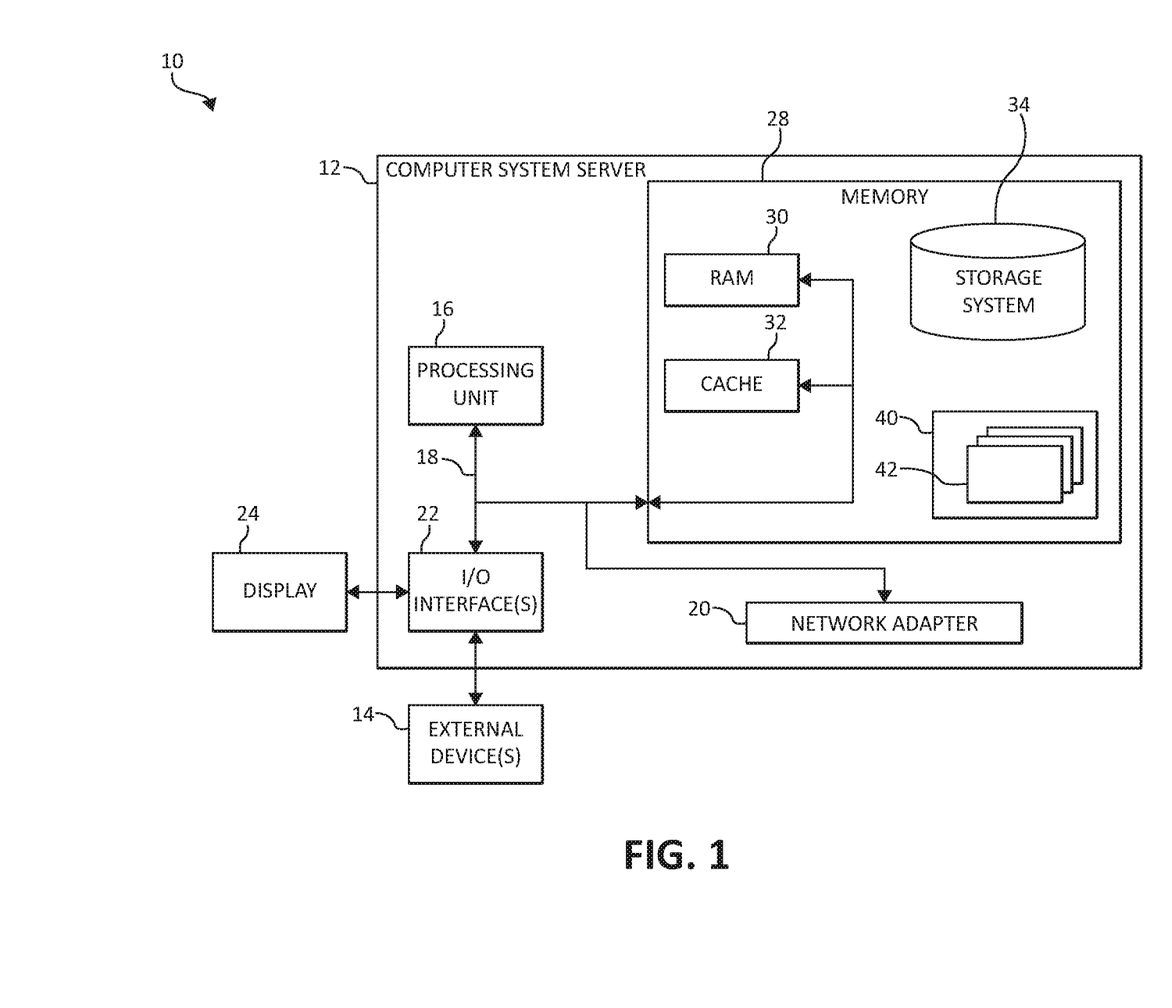
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
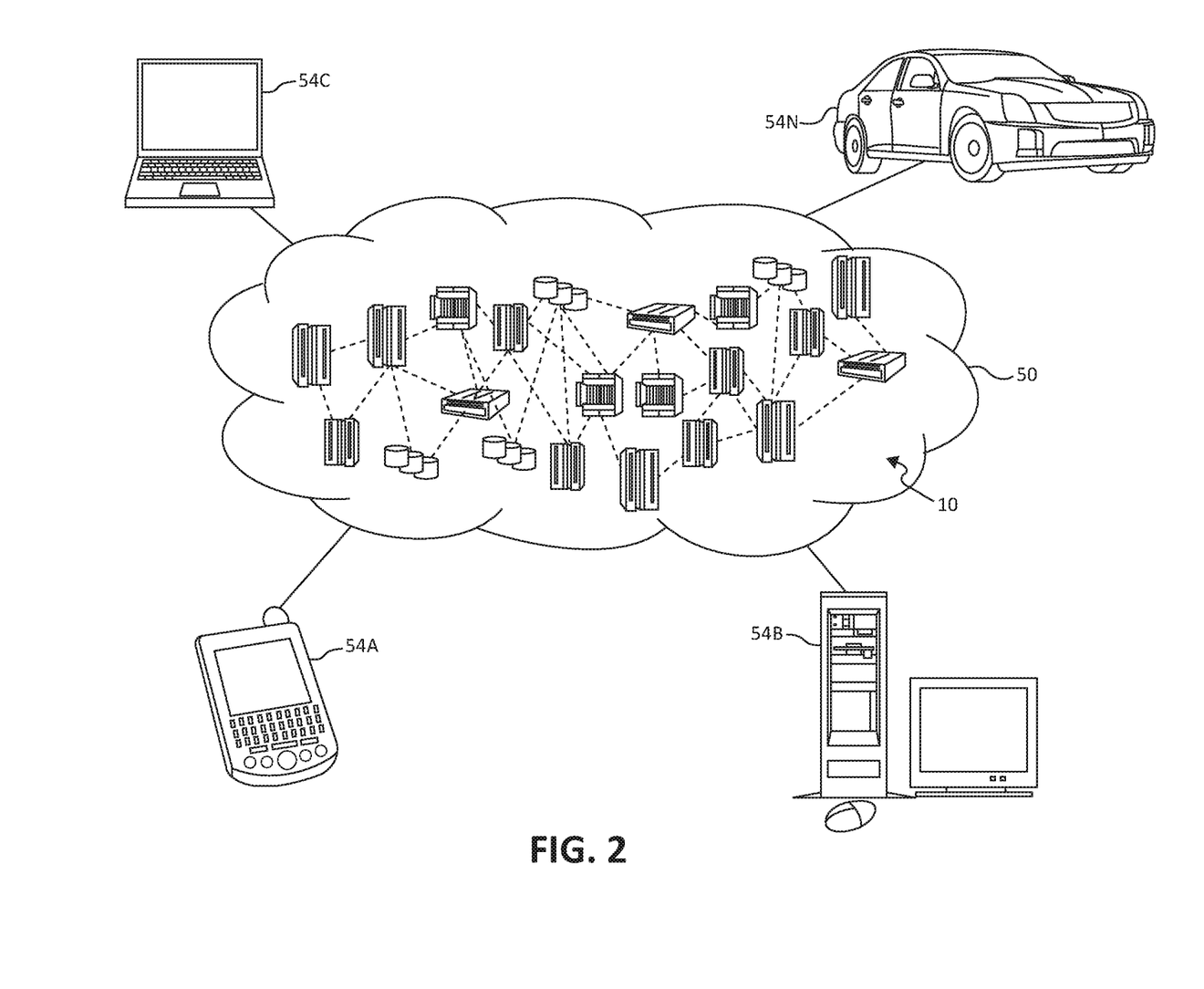
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
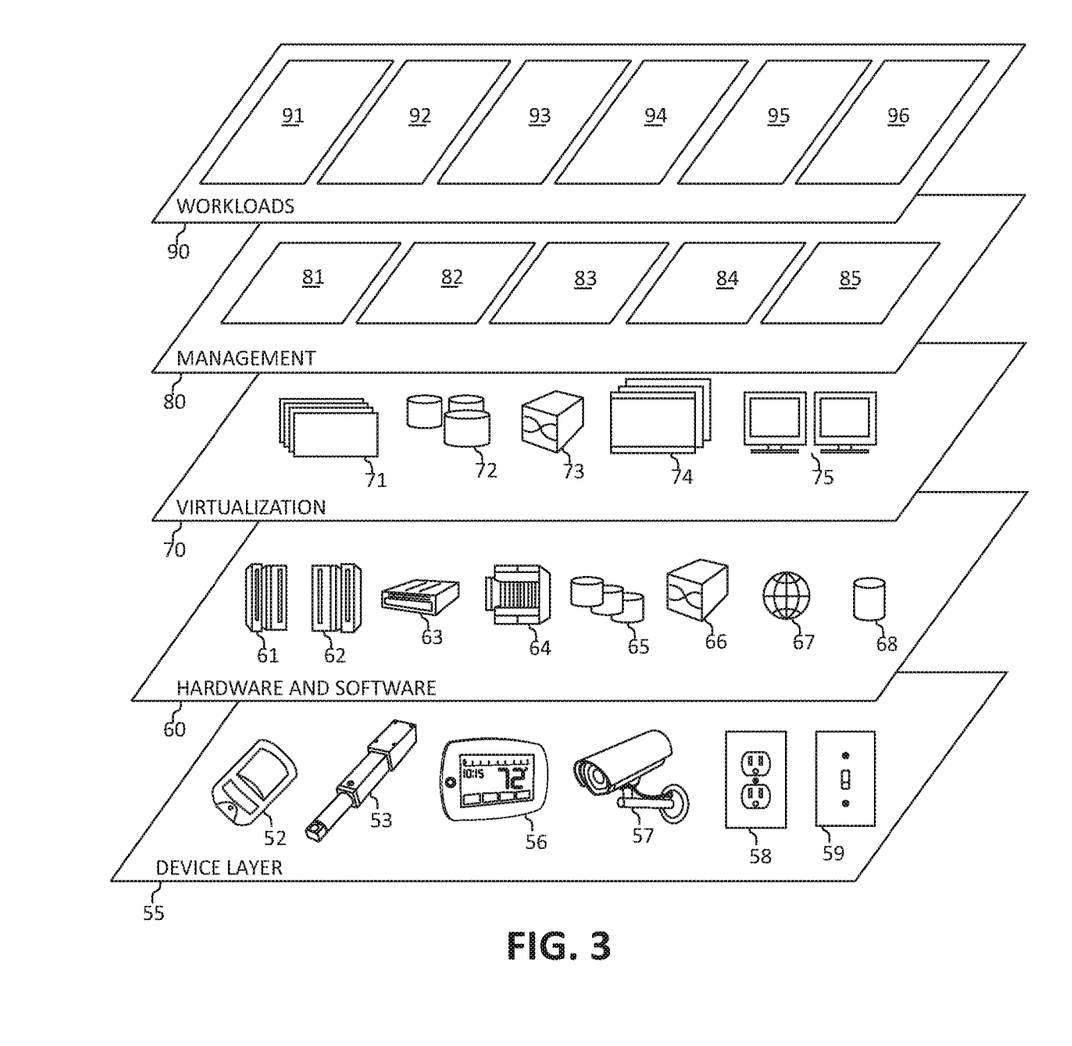
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for using blockchain for flexible application licensing. In addition, workloads and functions 96 for using blockchain for flexible application licensing may include such operations as data analytics, data analysis, and as will be further described, notification functionality. One of ordinary skill in the art will appreciate that the workloads and functions 96 for using blockchain for flexible application licensing may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In one aspect, the mechanisms of the illustrated embodiments provide a novel approach for building a trusted and flexible application licensing model using blockchain. The blockchain may be used to provide a flexible licensing model, validate application usage, authenticate application business-lead generation (e.g., application upgrades, additional features or services, etc.), automatically suggest one or more licensing models, and/or offer one or more additional application features or services to a user such as, for example, an organization or customer based upon applied analytics on the application's history usage data or patterns.

The licensing token may be provided from a pool of licensing tokens using a blockchain database (e.g., a transactional database based on blockchain protocols) for using, tracking, and monitoring an application and application usage. The usage of each application may be validated according to the one or more licensing tokens in the blockchain.

In one aspect, the BlueKeys count may be derived based on one or more parameters such as, for example, a price of the application (e.g., a SKU) and/or by the user demand. The total BlueKeys count may represent a number of concurrent users that an organization should have at a given instance of time. Thus, each time a user/customer logs-on to an application that requires a license, depending on what application is being accessed, a corresponding number of BlueKeys may be consumed. However, when the user logs-off from the application, the BlueKeys return back into the pool of BlueKeys. The returned BlueKeys are now made available for other users in the entity/organization to access any of the available applications.

Figure 4:
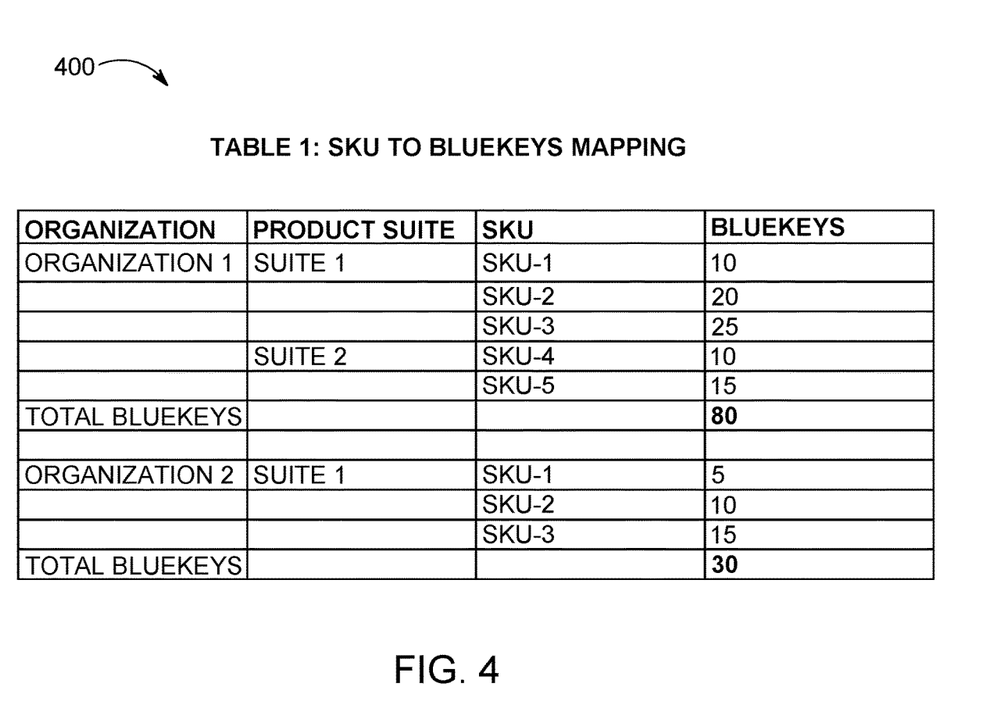
FIG. 4 is a diagram of a table illustrating SKU to BlueKeys mapping in which aspects of the present invention may be realized.

For example, FIG. 4 depicts a table 400 illustrating SKU to BlueKeys mapping. The table 400 depicts a combined total number of available BlueKeys (e.g., 80 BlueKeys) for organization 1 and a total number of available BlueKeys (e.g., 30 BlueKeys) for organization 2. The total available number of BlueKeys provided and sold to each organization are mapped to the SKUs and product suites. For example, if product suite 1 and SKU-1 are accessed or started, 10 BlueKeys are then allocated to the SKU-1 leaving only 70 remaining for the user. However, if suite 2 and SKU-4 are started at the same time as suite 1, 10 BlueKeys are consumed from the remaining 70 BlueKeys for suite 2 and SKU-4 leaving now only 60 BlueKeys. Upon terminating the usage of the application, the BlueKeys may be returned to the pool of licensed tokens. For example, if a user logs off and terminates use of suite 1 and SKU-1, the 10 BlueKeys consumed for suite 1 and SKU-1 are returned to the pool of the BlueKeys leaving 70 BlueKeys available for another user to select any one of the applications (such as, for example, suite 1 and SKU-3 where 25 BlueKeys would be consumed leaving 45 BlueKeys remaining).

Figure 5:
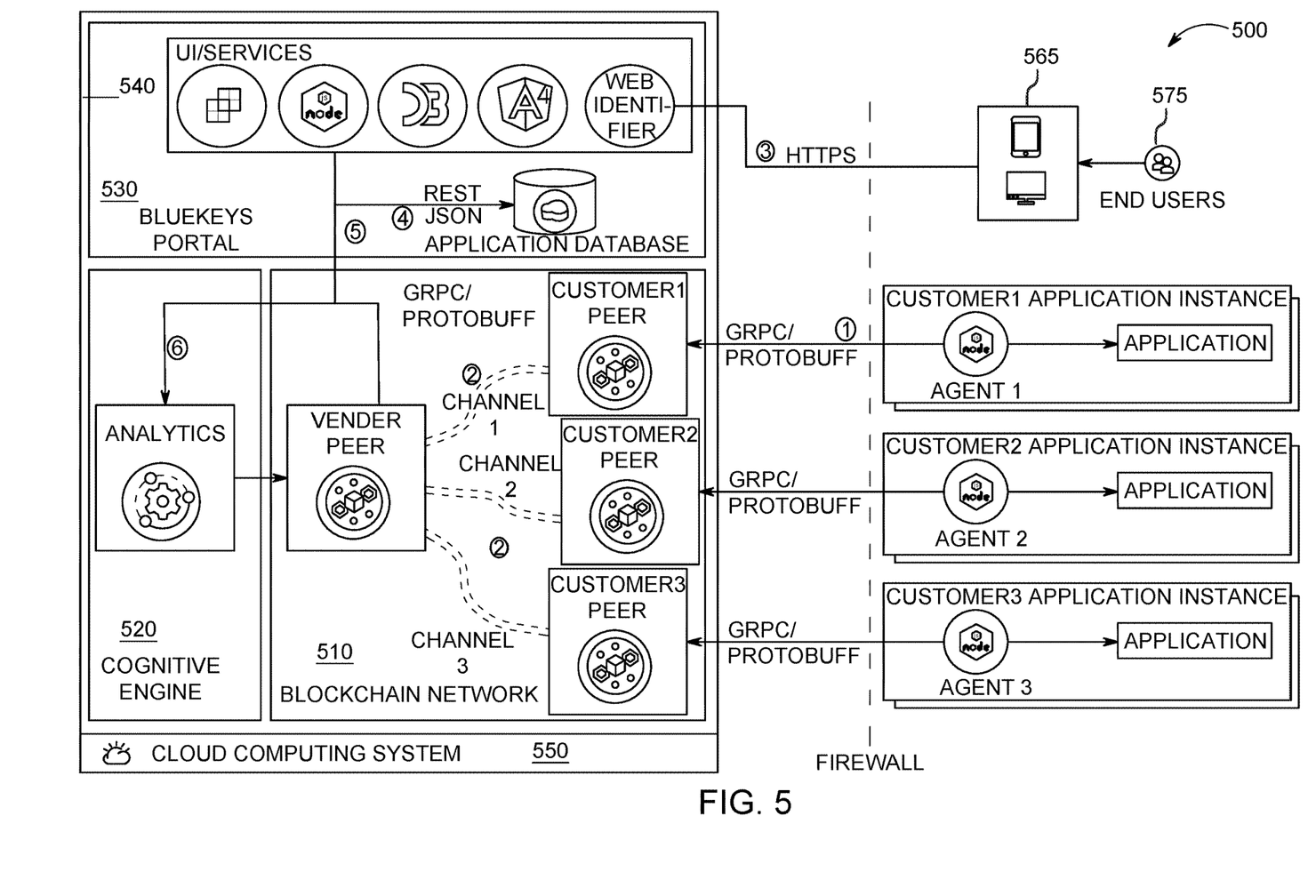
FIG. 5 is an additional block diagram depicting an exemplary functional relationship between various aspects of the present invention.

Turning now to FIG. 5, a block diagram of exemplary functionality of a computing system 500 for building a trusted and flexible application licensing model using blockchain in a cloud storage system is depicted. In one aspect, one or more of the components, modules, services, applications, and/or functions described in FIGS. 1-4 may be used in FIG. 5. As will be seen, many of the functional blocks may also be considered "modules" of functionality, in the same descriptive sense as has been previously described in FIGS. 1-4.

As shown, the computing system 500 may be a cloud-based solution in a cloud computing system 550 and may have one or more agents (e.g., Agent 1, Agent 2, and Agent 3), a blockchain network 510, a license usage analytical engine 520 (e.g., cognitive engine), and license usage dashboard 530 (e.g., BlueKeys portal). In one aspect, one or more protocols, frameworks, or unstructured data serialization operations (e.g., a remote procedure call "RPC" such as, gRPC, protocol buffers "Protobuff", JavaScript® Object Notation "JSON", and Hypertext Transfer Protocol secure "HTTPs") may be used to instantiate connections, serialize data, transmit data, or provide access to data between each of the agents, the blockchain network 510, the license usage analytical engine 520, the license usage dashboard 530, and/or the customers or end users 575.

The blockchain network 510 may include one or more customer peers (e.g., customer 1 peer, customer 2 peer, customer 3 peer) and an application vender peer. The customer peers and application vendor peer may be in communication with each other via one or more channels (e.g., channel 1, channel 2, and channel 3) (forming a peer-to-peer relationship). In one aspect, the blockchain network 510 may be a permission blockchain.

The license usage analytical engine 520 may include an analytics component to analyze, track, monitor, and manage application usage via the BlueKeys in the blockchain of the blockchain network 510.

The license usage dashboard 530 may include and/or provide a BlueKeys usage dashboard 540 (e.g., user interface "UI" services dashboard) for display on a graphical user interface ("GUI") on one or more computing devices 565 for one or more customers and/or users 575 (e.g., end users). The license usage dashboard 530 may also use an application database such as, for example, a JSON database (e.g., an IBM® Cloudant™ database).

In one aspect, the one or more agents may be associated with one or more application instances of a customer (e.g., customer 1, customer 2, and customer 3). The blockchain network 510 and the license usage dashboard 530 (e.g., BlueKeys portal) may be deployed on a cloud computing infrastructure (e.g., cloud computing system 550) such as, for example, a SaaS to enable the customers and/or end users access via the internet. The agents (e.g., Agent 1, Agent 2, and Agent 3) may execute behind a firewall on a customer premise. A customer organization (e.g., customer 1, customer 2, and customer 3) may execute one or more instances of an agent. The data for various customer organizations may be securely isolated via the blockchain channels such as, for example, channel 1, channel 2, and/or channel 3. In one aspect, the blockchain is a permission blockchain.

The application packages (e.g., application instances) requiring usage monitoring may use a service such as, for example, an analytics and monitoring service of the cognitive engine 520 that periodically wakes up and logs a number of concurrent users (which may be in an internal database). The agents may execute locally on the customer premise and may be responsible for sending the logged usage data into the blockchain. Blockchain network 510 may hold the BlueKeys usage data as a source-of-truth to be shared between an application vendor, the participating customers, end user 575, and/or any third party regulatory institutions. The license usage dashboard 530 may provide a common interface (e.g., UI/service) to each of the customers and/or end users 575 to review the customer's and/or end user's 575 BlueKeys allocation amount and usage reports.

To further illustrate, consider the following flow process of FIG. 5. 1) An agent (e.g., Agent 1, Agent 2, and Agent 3) may extract or pull usage data from installed packaged applications via a web service end-point. The agent may parse the extracted data and convert the data into a blockchain data structure (e.g., a format pertinent for Blockchain use). The agent may post the data into the appropriate channel in the blockchain (e.g., blockchain network 510).

2) The usage data may be recorded on blockchain in the blockchain network 510. Each customer can bring in the peer of the customer (e.g., customer 1 peer, customer 2 peer, and customer 3 peer) and join with the vendor peer via a channel forming a distributed blockchain ledger. The usage data is therefore unable to be tampered with, making the blockchain ledger the source-of-truth.

3) The BlueKeys usage dashboard 540 may provide all the participants a single point access to manage and monitor the use of BlueKeys, which may be accessed via one or more computer devices 565. A user such as, for example, end user 575 may login to view usage metrics and set alert notifications via the BlueKeys usage dashboard 540. An application (application vendor) may perform the following functions: training or onboarding of customers/users, provisioning of the BlueKeys, monitoring application usage, and/or setting of notifications.

4) Configuration data may be stored in an application database (e.g., the JSON database) and the license usage dashboard 530 (e.g., BlueKeys portal) may use the application database for referencing data. Usage data may be pulled from the blockchain ledger dynamically by the license usage dashboard 530. Also, the license usage analytical engine 520 may continuously analyze the history data recorded in the blockchain ledger of the blockchain network 510 and identify excessive application usage patterns (e.g., excessive license usage) above a threshold, and/or application usage patterns below the threshold. The license usage analytical engine 520 may trigger a notification providing one or more additional application features, services, and/or upgrade options according to the analysis. For example, a notification to purchase additional application licenses to add BlueKeys to the pool of BlueKeys may be provided if the application usage patterns indicate excessive use greater than a defined threshold.

Figure 6:
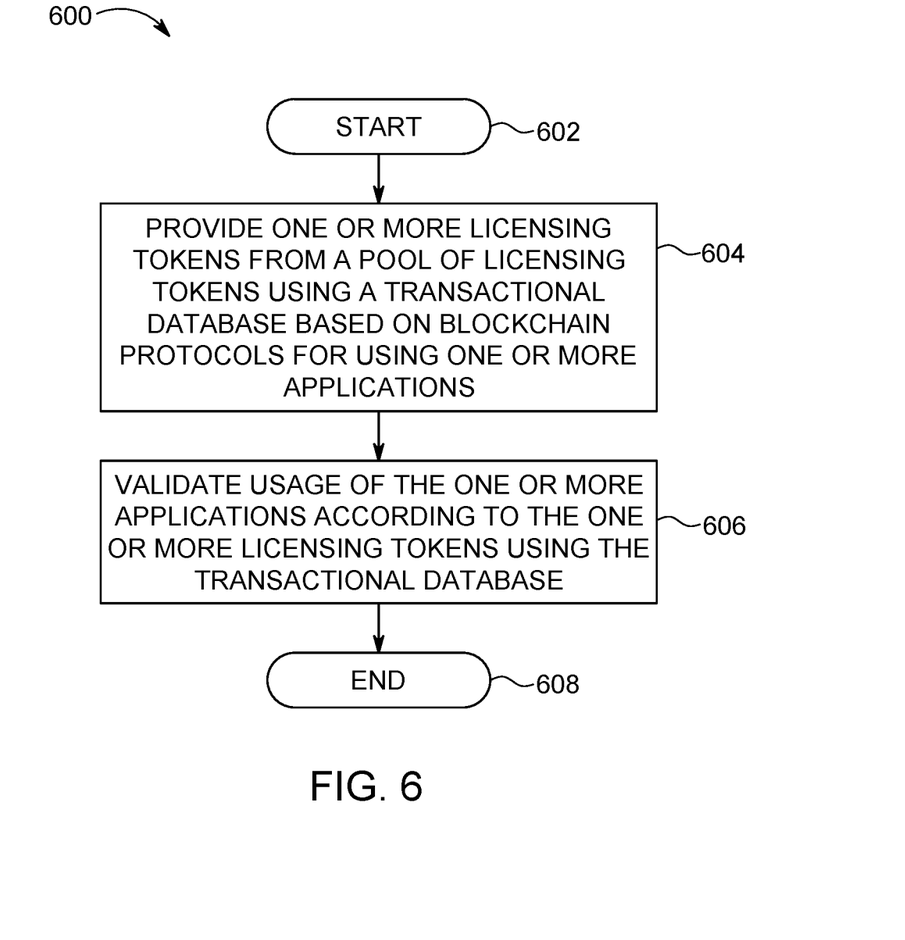
FIG. 6 is an additional flowchart diagram depicting an additional exemplary method for building a trusted and flexible application licensing model using blockchain by a processor, again in which aspects of the present invention may be realized.

Turning now to FIG. 6, a method 600 building a trusted and flexible application licensing model using blockchain by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602. A licensing token, from a pool of licensing tokens, is provided using a transactional database based on blockchain protocols for using an application, as in block 604. Usage of each application may be validated according to the one or more licensing tokens using the transactional database, as in block 606. The functionality 600 may end, as in block 608.

In one aspect, in conjunction with and/or as part of at least one block of FIG. 6, the operations of method 600 may include each of the following. The operations of method 600 may use the one or more licensing tokens from the pool of licensing tokens upon initiating a login operation to the one or more applications. One or more licensing tokens may be returned to the pool of licensing tokens upon terminating use of the one or more applications, or the one or more licensing tokens may be used, returned to the pool of licensing tokens, by an alternative user for the one or more applications, an alternative application, or a combination thereof.

The operations of method 600 may extract usage data of the one or more applications and/or convert the usage data into a blockchain data structure for storing in the transactional database. The usage data of the one or more applications may be recorded in the transactional database.

The usage data storage may be stored in the transactional database via an interactive graphical user interface (GUI) of a computing device. The operations of method 600 may determine usage of the one or more applications exceeds a total number of the pool of licensing tokens using the transactional database.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for using blockchain for flexible application licensing by a processor, comprising:
    forming a blockchain in a blockchain network having a vendor peer and a plurality of customer peers, wherein the blockchain comprises a transactional database maintaining usage data for one or more applications and a pool of licensing tokens having a finite number of licensing tokens for the one or more applications;
    for each instantiated instance of an application of the one or more applications executed locally on a computing device associated with a user, inclusive of a first instance of the application and any instances of the application subsequent to the first instance, retrieving one or more licensing tokens from the pool of licensing tokens for each instance of the application and deducting the one or more licensing tokens for each instance of the application from the finite number of licensing tokens by recording the one or more licensing tokens for each instance of the application as being consumed within the blockchain;
    respectively returning the one or more licensing tokens to the pool of licensing tokens associated with each instance of the application upon terminating use of each instance of the application, wherein the returned one or more licensing tokens are recorded as being returned to the pool of licensing tokens in the blockchain and are available for use by an alternative application of the one or more applications;
    executing an agent local to the one or more applications to monitor the usage data of the one or more applications, wherein monitoring the usage data by the agent includes periodically, according to a predetermined schedule, waking from a sleep mode and logging a number of concurrent users of the one or more applications;
    extracting the usage data from the one or more applications by the agent via a web service end-point, wherein the agent parses the usage data, converts the usage data into a blockchain data structure associated with a format for storage in the blockchain, and posts the blockchain data structure in a channel associated with the vendor peer and the plurality of customer peers;
    providing a usage dashboard on an interface comprising a single access point for all participants associated with the vendor peer and the plurality of customer peers to display metrics associated with the usage data and provision the one or more tokens in the pool of licensing tokens, wherein the usage dashboard pulls the usage information from the blockchain dynamically, and compares the usage information to configuration data stored in an application database; and
    validating usage of the one or more applications according to the usage data associated with the one or more licensing tokens using the blockchain according to the comparison of the usage information to the configuration data.

2. The method of claim 1, further including using the one or more licensing tokens from the pool of licensing tokens upon initiating a login operation to the one or more applications.

3. The method of claim 1, further including recording the usage data of the one or more applications in the blockchain.

4. The method of claim 3, wherein the usage dashboard is accessed via an interactive graphical user interface (GUI) of the computing device.

5. The method of claim 1, further including determining the usage of the one or more applications exceeds the total number of the pool of licensing tokens using the blockchain.

6. A system for using blockchain for flexible application licensing, comprising:
    one or more computers with executable instructions that when executed cause the system to:
        form a blockchain in a blockchain network having a vendor peer and a plurality of customer peers, wherein the blockchain comprises a transactional database maintaining usage data for one or more applications and a pool of licensing tokens having a finite number of licensing tokens for the one or more applications;
        for each instantiated instance of an application of the one or more applications executed locally on a computing device of the one or more computers associated with a user, inclusive of a first instance of the application and any instances of the application subsequent to the first instance, retrieve one or more licensing tokens from the pool of licensing tokens for each instance of the application and deducting the one or more licensing tokens for each instance of the application from the finite number of licensing tokens by recording the one or more licensing tokens for each instance of the application as being consumed within the blockchain;
        respectively return the one or more licensing tokens to the pool of licensing tokens associated with each instance of the application upon terminating use of each instance of the application, wherein the returned one or more licensing tokens are recorded as being returned to the pool of licensing tokens in the blockchain and are available for use by an alternative application of the one or more applications;
        execute an agent local to the one or more applications to monitor the usage data of the one or more applications, wherein monitoring the usage data by the agent includes periodically, according to a predetermined schedule, waking from a sleep mode and logging a number of concurrent users of the one or more applications;
        extract the usage data from the one or more applications by the agent via a web service end-point, wherein the agent parses the usage data, converts the usage data into a blockchain data structure associated with a format for storage in the blockchain, and posts the blockchain data structure in a channel associated with the vendor peer and the plurality of customer peers;
        provide a usage dashboard on an interface comprising a single access point for all participants associated with the vendor peer and the plurality of customer peers to display metrics associated with the usage data and provision the one or more tokens in the pool of licensing tokens, wherein the usage dashboard pulls the usage information from the blockchain dynamically, and compares the usage information to configuration data stored in an application database; and validate usage of the one or more applications according to the usage data associated with the one or more licensing tokens using the blockchain according to the comparison of the usage information to the configuration data.

7. The system of claim 6, wherein the executable instructions further use the one or more licensing tokens from the pool of licensing tokens upon initiating a login operation to the one or more applications.

8. The system of claim 6, wherein the executable instructions further record the usage data of the one or more applications in the blockchain.

9. The system of claim 8, wherein the usage dashboard is accessed via an interactive graphical user interface (GUI) of the computing device.

10. The system of claim 6, wherein the executable instructions further determine the usage of the one or more applications exceeds the total number of the pool of licensing tokens using the blockchain.

11. A computer program product for, by a processor, using blockchain for flexible application licensing, the computer program product comprising a non-transitory computer-readable storage medium having computer-readable program code portions stored therein, the computer-readable program code portions comprising:

an executable portion that forms a blockchain in a blockchain network having a vendor peer and a plurality of customer peers, wherein the blockchain comprises a transactional database maintaining usage data for one or more applications and a pool of licensing tokens having a finite number of licensing tokens for the one or more applications;

an executable portion that, for each instantiated instance of an application of the one or more applications executed locally on a computing device associated with a user, inclusive of a first instance of the application and any instances of the application subsequent to the first instance, retrieves one or more licensing tokens from the pool of licensing tokens for each instance of the application and deducting the one or more licensing tokens for each instance of the application from the finite number of licensing tokens by recording the one or more licensing tokens for each instance of the application as being consumed within the blockchain;

an executable portion that respectively returns the one or more licensing tokens to the pool of licensing tokens associated with each instance of the application upon terminating use of each instance of the application, wherein the returned one or more licensing tokens are recorded as being returned to the pool of licensing tokens in the blockchain and are available for use by an alternative application of the one or more applications;

an executable portion that executes an agent local to the one or more applications to monitor the usage data of the one or more applications, wherein monitoring the usage data by the agent includes periodically, according to a predetermined schedule, waking from a sleep mode and logging a number of concurrent users of the one or more applications;

an executable portion that extracts the usage data from the one or more applications by the agent via a web service end-point, wherein the agent parses the usage data, converts the usage data into a blockchain data structure associated with a format for storage in the blockchain, and posts the blockchain data structure in a channel associated with the vendor peer and the plurality of customer peers;

an executable portion that provides a usage dashboard on an interface comprising a single access point for all participants associated with the vendor peer and the plurality of customer peers to display metrics associated with the usage data and provision the one or more tokens in the pool of licensing tokens, wherein the usage dashboard pulls the usage information from the blockchain dynamically, and compares the usage information to configuration data stored in an application database; and an executable portion that validates usage of the one or more applications according to the usage data associated with the one or more licensing tokens using the blockchain according to the comparison of the usage information to the configuration data.

12. The computer program product of claim 11, further including an executable portion that uses the one or more licensing tokens from the pool of licensing tokens upon initiating a login operation to the one or more applications.

13. The computer program product of claim 11, further including an executable portion that records the usage data of the one or more applications in the blockchain.

14. The computer program product of claim 13, wherein the usage dashboard is accessed via an interactive graphical user interface (GUI) of the computing device.

15. The computer program product of claim 11, further including an executable portion that determines the usage of the one or more applications exceeds the total number of the pool of licensing tokens using the blockchain.

* * * * *